(12) United States Patent
Wang

(10) Patent No.: US 8,745,809 B2
(45) Date of Patent: Jun. 10, 2014

(54) GLASS SURFACE CLEANING DEVICE

(75) Inventor: Song-Hao Wang, Pittsburgh, PA (US)

(73) Assignee: Kun Shan University, Tainan (TW)

( * ) Notice: Subject to any disclaimer, the term of this patent is extended or adjusted under 35 U.S.C. 154(b) by 194 days.

(21) Appl. No.: 13/227,297

(22) Filed: Sep. 7, 2011

(65) Prior Publication Data

US 2013/0055516 A1 Mar. 7, 2013

(51) Int. Cl.
*B08B 11/04* (2006.01)
*B08B 1/00* (2006.01)
*F28D 15/00* (2006.01)

(52) U.S. Cl.
USPC ............ 15/250.3; 15/250.001; 15/250.11; 15/103; 15/250.29; 60/641.8; 60/520; 126/903

(58) Field of Classification Search
USPC .......... 15/103, 246, 250.11, 250.3, 250.31, 15/250.29, 250.001; 60/641.8, 508–515, 60/520; 126/903; 323/371
See application file for complete search history.

(56) References Cited

U.S. PATENT DOCUMENTS

| | | | | |
|---|---|---|---|---|
| 1,180,683 | A | * | 4/1916 | Zega ........................ 15/250.29 |
| 1,234,191 | A | * | 7/1917 | Mahaley .................... 73/324 |
| 3,238,555 | A | * | 3/1966 | Cels .......................... 15/250.04 |
| 4,339,839 | A | * | 7/1982 | Knights ..................... 15/250.04 |

FOREIGN PATENT DOCUMENTS

| | | | |
|---|---|---|---|
| CN | 101658851 A | * | 3/2010 |
| GB | 2132077 A | * | 7/1984 |
| JP | 63-112247 | * | 5/1988 |
| JP | 2005-271916 | * | 10/2005 |
| TW | M340433 | | 9/2008 |
| TW | M341561 | | 10/2008 |

OTHER PUBLICATIONS

Machine translation of description portion of CN101658851 published Mar. 2010.*
Machine translation of description portion of JP 2005-271916 published Oct. 2005.*

\* cited by examiner

*Primary Examiner* — Gary Graham
(74) *Attorney, Agent, or Firm* — Muncy, Geissler, Olds & Lowe, P.C.

(57) ABSTRACT

A cleaning device includes a first expansion unit in which a first expansion member is received and the first expansion unit is connected to a cylinder which has a piston received therein and the piston defines a first room and a second room in the cylinder. The piston has a first magnetic member which magnetically drives a movable member with a second magnetic member connected thereto. The movable member moves along the cylinder. A cleaning unit is co-movably connected with the movable member. By expansion of the first expansion unit by the sun, the movable member is moved and the cleaning unit is moved along the glass surface. The action consumes no electric power.

7 Claims, 5 Drawing Sheets

GLASS SURFACE CLEANING DEVICE

FIELD OF THE INVENTION

The present invention relates to a glass surface cleaning device, and more particularly, to an expansion member which inflates by the sun and activates a cleaning unit to move along the glass windows to clean the glass surfaces.

BACKGROUND OF THE INVENTION

The glass of a conventional solar-powered batteries or glass windows of buildings is easily attached by dust so that the transparency of the glasses is lowered and which affects the efficiency and aesthetic appearance. Therefore, the glasses are routinely cleaned up by significant labor power.

Taiwan Utility Model No. M340433 discloses an automatic folding and cleaning device for panel of solar batteries and includes a panel connected to a frame which has a folding device, the folding device is driven by a motor which drives a bar and two-section links so as to fold the frame. The cleaning device is located on the panel and the brushes are activated by the motor to remove the dust on the panel. The power of the motor for the cleaning device is provided by the solar battery.

Taiwan Utility Model No. M341561 discloses an automatic cleaning device for cleaning window glasses and includes two rails, a cleaning roller and a power source, wherein the rails are located on top and bottom of the window and the cleaning roll is movably connected between the two rails. The power source drives the cleaning roller to move along the rails so as to clean the glass. However, the power of the power source is provided from an external power source.

Electric power and solar power are necessary for operation of the cleaning devices mentioned above. In other words, the existed cleaning devices consume different types of energy and most of them involve complicated structure and high manufacturing and maintenance costs.

The present invention intends to provide a cleaning device for cleaning glasses of solar power batteries or windows of buildings, wherein the cleaning device does not consume electric power.

SUMMARY OF THE INVENTION

The present invention relates to a cleaning device and comprises a first expansion unit having a first expansion member received therein. A cylinder has a piston received therein and the piston defines a first room and a second room in the cylinder. The first room communicates with the first expansion unit. The piston has at least one first magnetic member connected thereon. The first magnetic member magnetically attracts a movable member to move along outside of the cylinder. The movable member has a second magnetic member which is magnetically attracted to the first magnetic member. A cleaning unit is co-movably connected with the movable member. A second expansion unit communicates with the second room and has a second expansion member received therein.

Preferably, the first expansion unit is connected to a first connection end and the first room has a first head. A first pipe is connected between the first connection end and the first head. The second expansion unit is connected to a second connection end and the second room has a second head. A second pipe is connected between the second connection end and the second head.

Preferably, the first magnetic member is a magnet or a magnetically attractable member, and the second magnetic member is a magnet which is magnetically attracted to the first magnetic member or a magnetically attractable member.

Preferably, the first expansion member is one of refrigerant, alcohol or mercury. The second expansion member is one of idle gas or refrigerant.

Preferably, the cleaning unit is a brush.

Preferably, the movable member has a rack and the cleaning unit has a gear which is engaged with the rack.

Preferably, the cleaning unit is directly fixed to the movable member and co-movable with the movable member.

The present invention provides a cleaning device which is powered by solar energy which inflates an expansion member to move the cleaning unit to clean the surfaces of the glasses of buildings or solar batteries. No labor is required.

There are no blind spot when cleaning the glasses by the cleaning device of the present invention.

The present invention is able to clean the glasses of buildings routinely and no blind spot to keep the glasses clean and neat.

The present invention does not need electric power to proceed with cleaning actions.

The present invention has a simple structure, and the manufacturing cost and maintenance cost are low.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
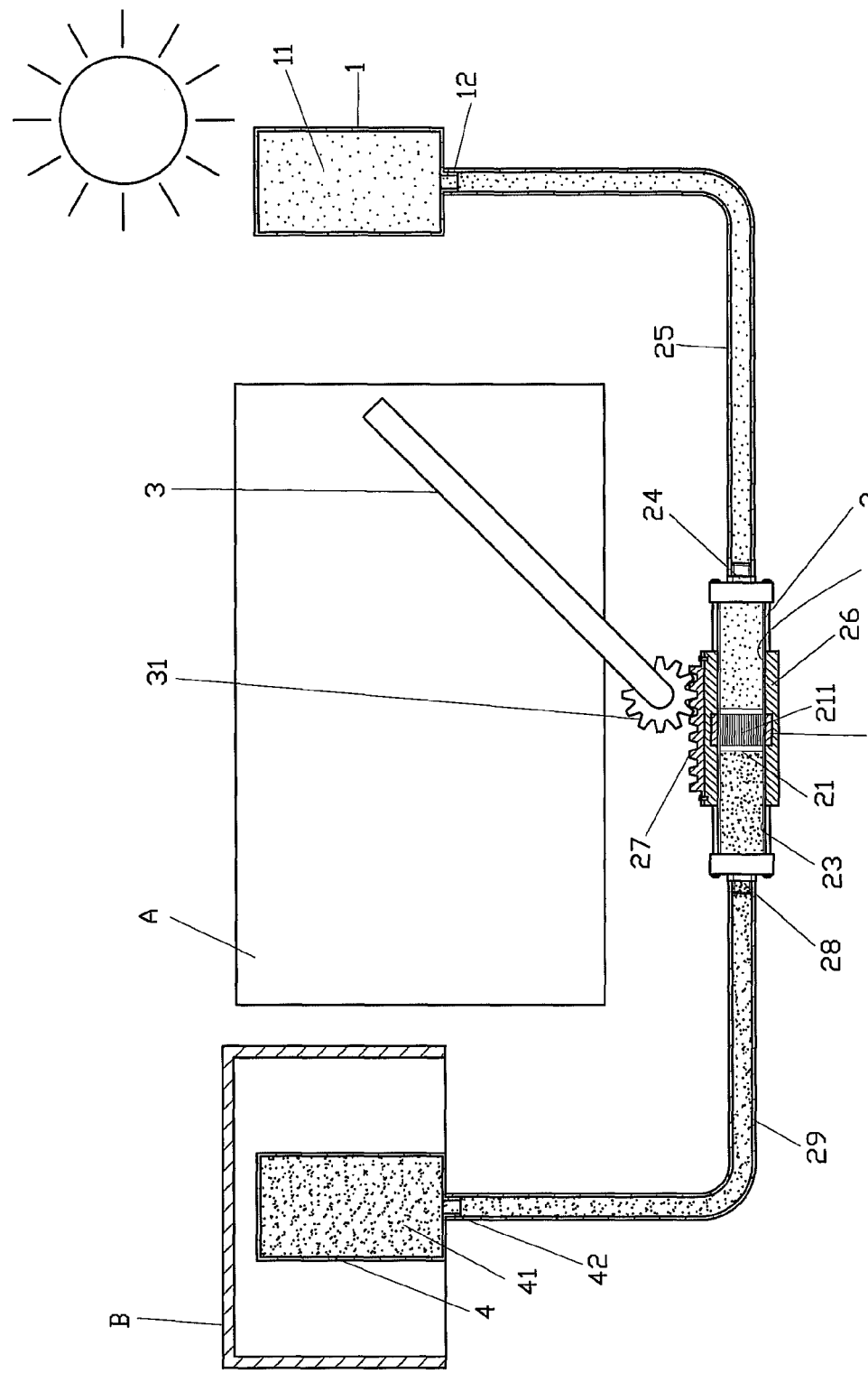
FIG. 1 shows that the first expansion unit inflates to drive the cleaning unit of the present invention to move in the first direction.
Figure 2:
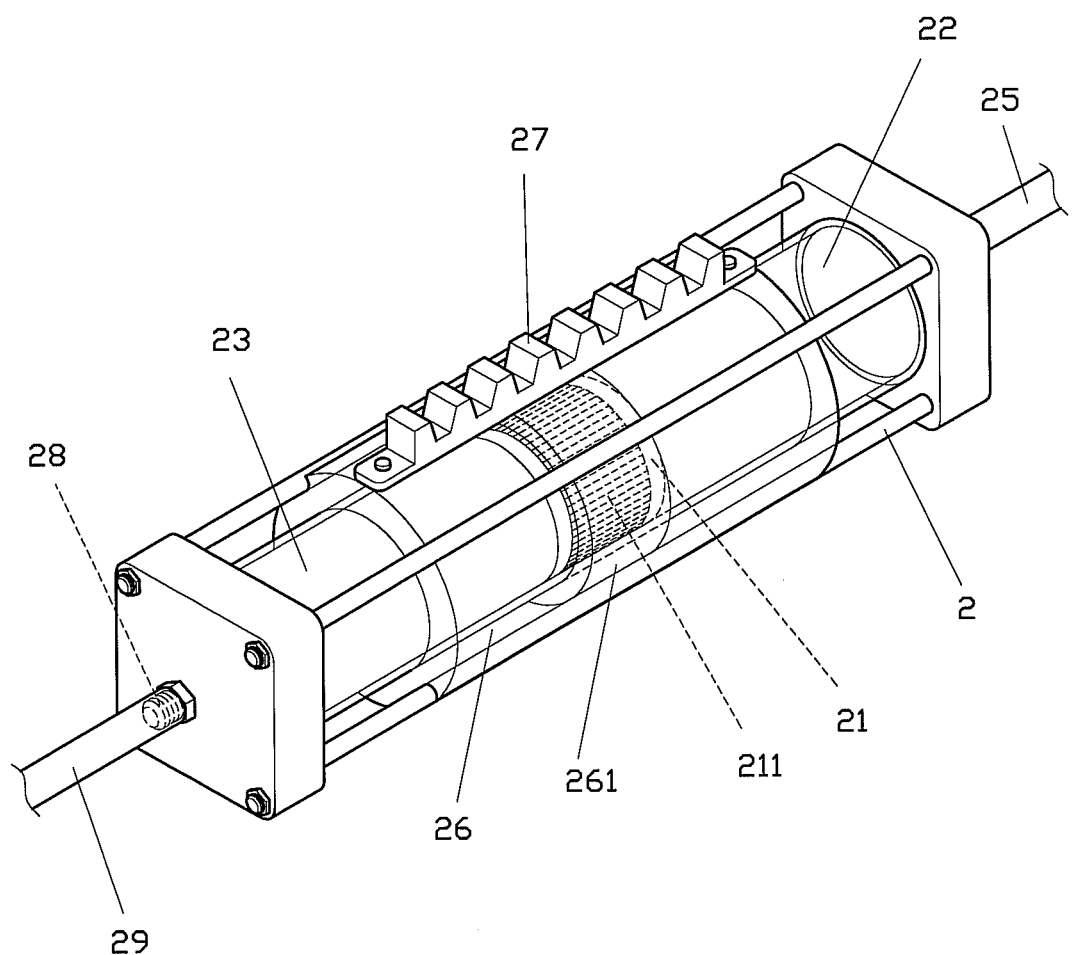
FIG. 2 shows the cylinder of the cleaning device of the present invention.

Referring to FIG. 1, the cleaning device of the present invention comprises a first expansion unit 1, a cylinder 2, a cleaning unit 3 and a second expansion unit 4.

The first expansion unit 1 has a first expansion member 11 received therein and the first expansion member 11 is liquid or gas that has a larger expansion coefficient, such as one of refrigerant, alcohol or mercury. The first expansion unit 1 is connected to a first connection end 12.

Figure 4:
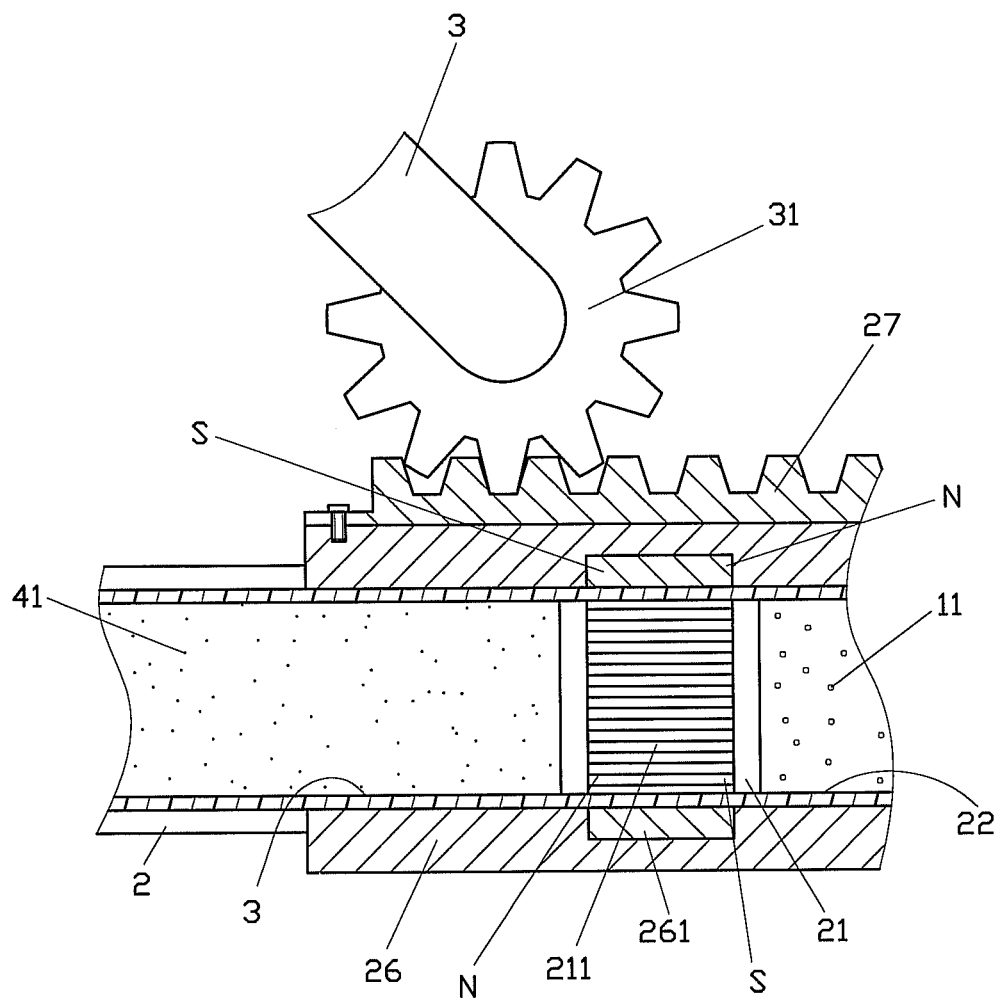
FIG. 4 shows that the piston magnetically attracts the movable member of the present invention to move.

The cylinder 2 is connected to the first expansion unit 1 and has a piston 21 received therein. The piston 21 has at least one first magnetic member 211 connected on the periphery thereof. The piston 21 defines a first room 22 and a second room 23 in the cylinder 2. The first magnetic member 211 is a magnet or a magnetically attractable member. The first room 22 has a first head 24, and a first pipe 25 is connected between the first connection end 12 and the first head 24. The first room 22 communicates with the first expansion unit 1. The first magnetic member 211 magnetically attracts a movable member 26 to move along outside of the cylinder 2. The movable member 26 has a second magnetic member 261 which is magnetically attracted to the first magnetic member 211. The second magnetic member 261 is a magnet which is magnetically attracted to the first magnetic member 211 or a magnetically attractable member. The S pole of the first magnetic member 211 is located corresponding to the N pole of the second magnetic member 261 as shown in FIG. 4. The N pole of the first magnetic member 211 is located corresponding to the S pole of the second magnetic member 261. The movable member 26 has a rack 27. The second room 23 has a second head 28 which is connected to a second pipe 29.

The cleaning unit 3 is co-movably connected with the movable member 26 and includes a gear 31 connected thereto which is engaged with the rack 27 on the cylinder 2. The cleaning unit 3 is a brush.

The second expansion unit 4 communicates with the second room 23 and has a second expansion member 41 received therein. The second expansion member 41 is one of idle gas or refrigerant. The second expansion unit 4 is connected to a second connection end 42 and the second pipe 29 is connected between the second connection end 42 and the second head 28.

The first expansion unit 1, the cylinder 2, and the second expansion unit 4 are connected to a glass "A" of a solar battery or a building. The first expansion unit 1 is located on the trace that the sun moves in the daytime and the second expansion unit 2 is located on the trace that the sun rays cannot reach or is hidden by a cover "B". The cleaning unit 3 is directly matched onto the glass "A" of the solar battery. When the sun moves in the daytime, the first expansion member 11 of the first expansion unit 1 expands. The first expansion member 11 goes through the first pipe 25 via the first connection end 12 and enters into the first room 22 of the cylinder 2 via the first head 24. The piston 21 is moved toward the second room 23 and the second expansion member 41 is pushed by the piston 21 and goes through the second pipe 29 via the second head 28 and enters into the second expansion unit 4 via the second connection end 42 to store the pressure. When the first magnetic member 211 of the piston 21 attracts the second magnetic member 261 as shown in FIG. 4 and the movable member 26 is moved along the outside of the cylinder 2. The rack 27 on the movable member 26 drives the gear 31 and the cleaning unit 3 brushes the surface of the glass "A" in the first direction to remove the dust on the glass "A".

Figure 3:
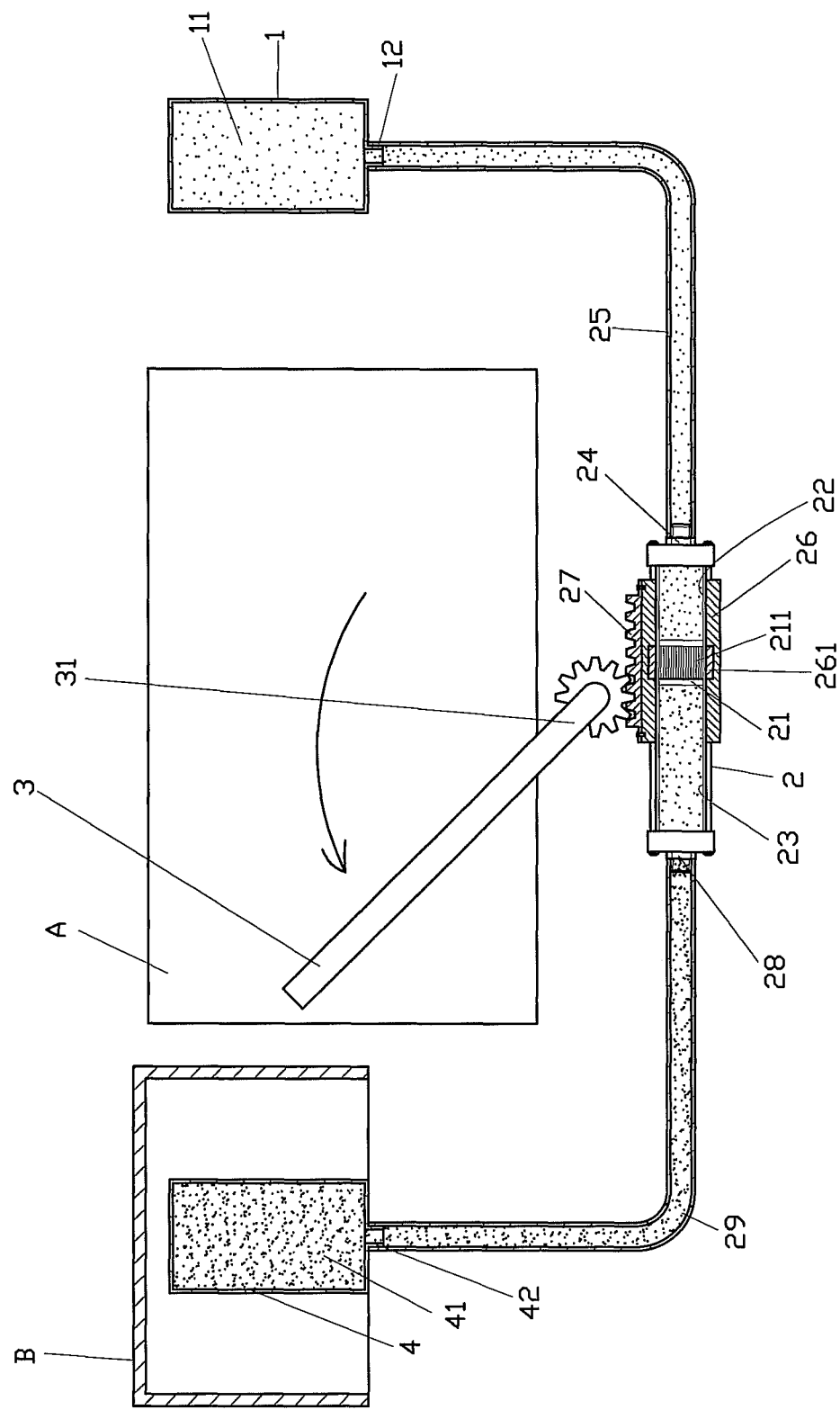
FIG. 3 shows that the second expansion unit inflates to drive the cleaning unit of the present invention to move in the second direction.

As shown in FIG. 3, when the sun moves away and the first expansion unit 1 cools, the first expansion member 11 shrinks and the second expansion member 41 releases the pressure, the second expansion member 41 enters into the second room 23 of the cylinder 2 via the second head 28 via the second pipe 29. The piston 21 is moved toward the first room 22 to compress the first expansion member 11. The first expansion member 11 goes through the first pipe 25 via the first head 24 and returns to the first expansion unit 1 via the first connection end 12. The first magnetic member 211 attracts the second magnetic member 261 to move the movable member 26 along the outside of the cylinder 2. The rack 27 on the movable member 26 drives the gear 31 and the cleaning unit 3 brushes the surface of the glass "A" in the second direction to remove the dust on the glass "A".

The piston 21 returns to its original position and stops, the above mention cleaning actions are repeated when the sun rises in the next day. Therefore, the glass "A" is cleaned twice a day to keep the surface clean.

Figure 5:
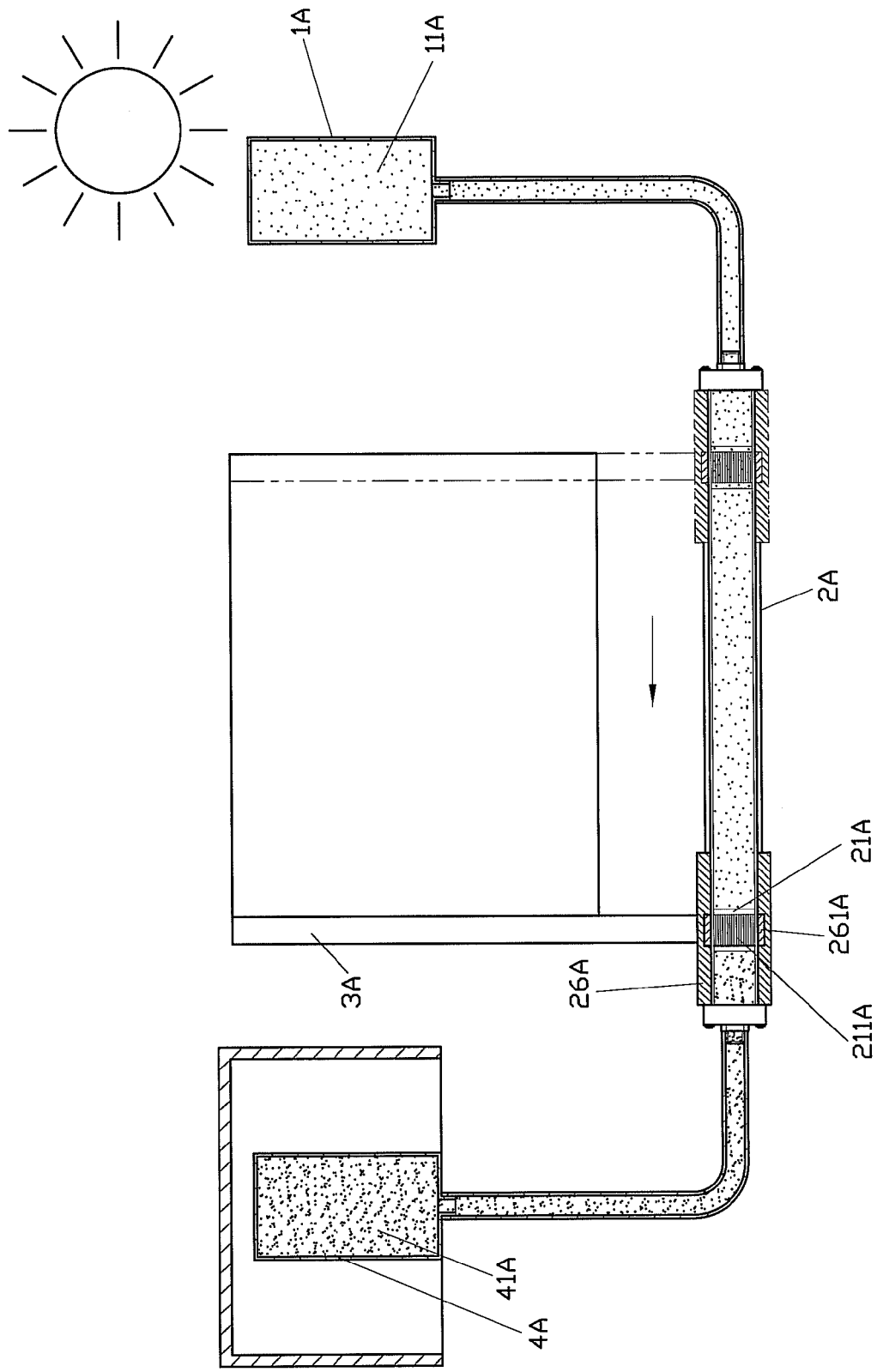
FIG. 5 shows another embodiment of the cleaning device of the present invention.

FIG. 5 shows another embodiment of the present invention. The first expansion unit 1A has a first expansion member 11A received therein and a cylinder 2A is connected to the first expansion unit 1A. The cylinder 2A has a piston 21A received therein and the piston 21A has at least one first magnetic member 211A connected on the periphery thereof. The first magnetic member 211A magnetically attracts a movable member 26A to move along outside of the cylinder 2A. The movable member 26A has a second magnetic member 261A which is magnetically attracted to the first magnetic member 211A. The cleaning unit 3A is directly fixed to the movable member 26A and is co-movable with the movable member 26A of the cylinder 2A. The second expansion unit 4A communicates with the cylinder 2A and has a second expansion member 41A received therein.

When the sun moves in the daytime and the first expansion member 11A expands to push the piston 21A. The first magnetic member 211A of the piston 21A attracts the second magnetic member 261A so that the movable member 26A is moved along the outside of the cylinder 2A, and the cleaning unit 3A brushes the surface of the glass "A" to remove the dust on the glass "A" to keep the transparency of the glass "A" and increase the efficiency of generating power.

While we have shown and described the embodiment in accordance with the present invention, it should be clear to those skilled in the art that further embodiments may be made without departing from the scope of the present invention.

What is claimed is:

1. A cleaning device comprising:
   a first expansion unit having a first expansion member received therein, the first expansion member having high thermal expansion coefficient such that the first expansion member expands when the first expansion unit receives solar rays;
   a cylinder having a piston received therein, the piston defining a first room and a second room in the cylinder, the first room communicating with the first expansion unit, the piston having at least one first magnetic member connected thereon, the first magnetic member magnetically attracting a movable member to move along outside of the cylinder, the movable member having a second magnetic member which is magnetically attracted to the first magnetic member;
   a cleaning unit co-movably connected with the movable member, and
   a second expansion unit communicating with the second room and having a second expansion member received therein;
   wherein the expanding first expansion member is received in the first room, causing the piston, first magnetic member, the second magnetic member and the cleaning unit to move.

2. The device as claimed in claim 1, wherein the first expansion unit is connected to a first connection end and the first room has a first head, a first pipe is connected between the first connection end and the first head, the second expansion unit is connected to a second connection end and the second room has a second head, a second pipe is connected between the second connection end and the second head.

3. The device as claimed in claim 1, wherein the first magnetic member is a magnet or a magnetically attractable member, the second magnetic member is a magnet which is magnetically attracted to the first magnetic member or a magnetically attractable member.

4. The device as claimed in claim 1, wherein the first expansion member is one of refrigerant, alcohol or mercury, and the second expansion member is one of idle gas or refrigerant.

5. The device as claimed in claim 1, wherein the cleaning unit is a brush.

6. The device as claimed in claim 1, wherein the movable member has a rack and the cleaning unit has a gear which is engaged with the rack.

7. The device as claimed in claim 1, wherein the cleaning unit is directly fixed to the movable member and co-movable with the movable member.

* * * * *